United States Patent
Sydekum et al.

[11] Patent Number: 5,553,713
[45] Date of Patent: Sep. 10, 1996

[54] VIBRATION DAMPER ASSEMBLY HAVING A SPRING SUPPORT WITH ADJUSTABLE SPRING PLATE, AND A SPRING SUPPORT WITH ADJUSTABLE SPRING PLATE

[75] Inventors: Heinz Sydekum, Dittelbrunn; Manfred Angles, Oerlenbach; Frank Hassmann, Schweinfurt, all of Germany

[73] Assignee: Fichtel & Sachs AG, Schweinfurt, Germany

[21] Appl. No.: 344,745

[22] Filed: Nov. 23, 1994

[30] Foreign Application Priority Data

Nov. 26, 1993 [DE] Germany ............... 43 40 494.4

[51] Int. Cl.⁶ .................................. B60G 13/00
[52] U.S. Cl. ............... 267/221; 267/175; 267/177
[58] Field of Search ............... 207/34, 221, 222, 207/225, 175, 177, 179; 280/708, 710, 724

[56] References Cited

U.S. PATENT DOCUMENTS

| | | | |
|---|---|---|---|
| 4,348,016 | 9/1982 | Milly | 267/177 |
| 4,366,969 | 1/1983 | Benya et al. | 267/221 X |
| 4,418,800 | 12/1983 | Hess | 267/177 X |
| 4,458,605 | 7/1984 | Herring, Jr. et al. | 267/175 X |
| 4,562,997 | 1/1986 | Iwata et al. | 267/221 |
| 4,830,395 | 5/1989 | Foley | 267/255 X |
| 5,044,614 | 9/1991 | Rau | 267/177 X |

FOREIGN PATENT DOCUMENTS

| | | |
|---|---|---|
| 1009442 | 5/1957 | Germany . |
| 2656707 | 6/1978 | Germany . |
| 3730177 | 3/1989 | Germany . |
| 4021314 | 5/1991 | Germany . |

*Primary Examiner*—Robert J. Oberleitner
*Assistant Examiner*—Lee W. Young
*Attorney, Agent, or Firm*—Nils H. Ljungman & Associates

[57] ABSTRACT

A vibration damper assembly having a spring support. The spring support comprises a first support with a spring plate and a second support with a spring plate, whereby at least one spring plate is axially adjustable, so that the spring tension of a spring between the spring plates can be changed, the spring support also a comprising locking device which is active between the adjustable spring plate and the corresponding support, characterized by the fact that the locking device is loosened for the axial adjustment of the spring plate so that during the axial adjustment, the spring plate can be moved independently of the locking means from any desired position into another position without twisting, and the locking device is held in this position.

19 Claims, 9 Drawing Sheets

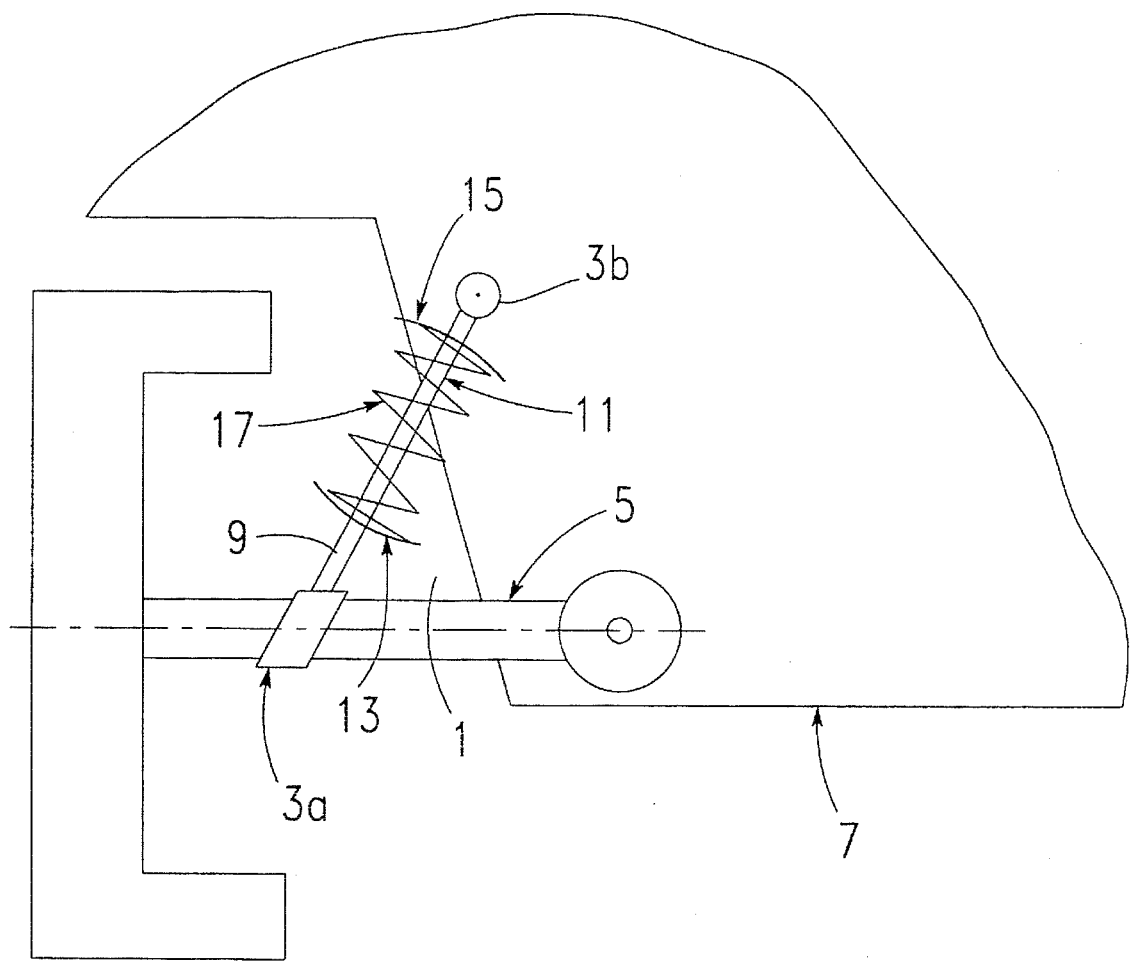

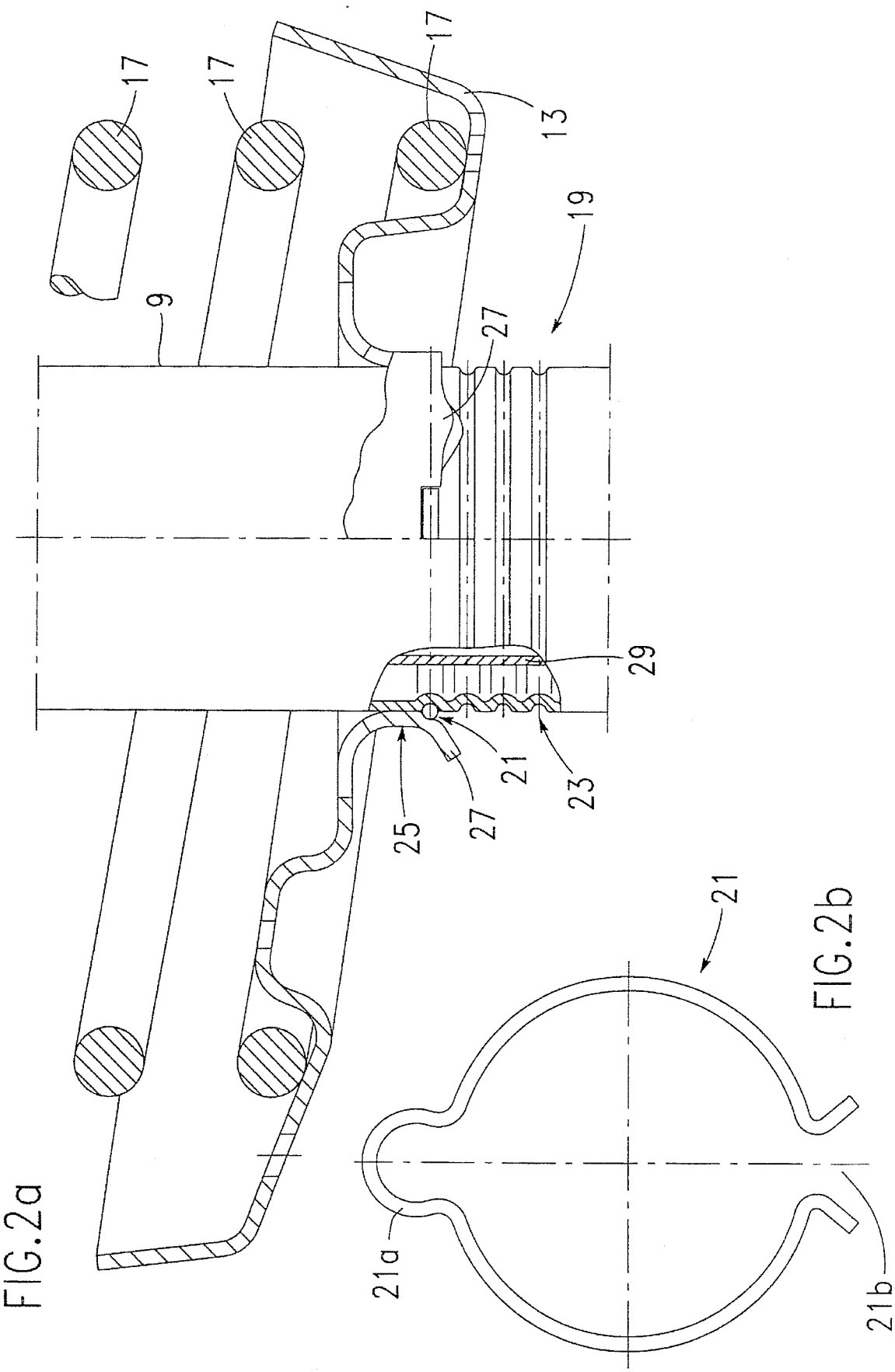

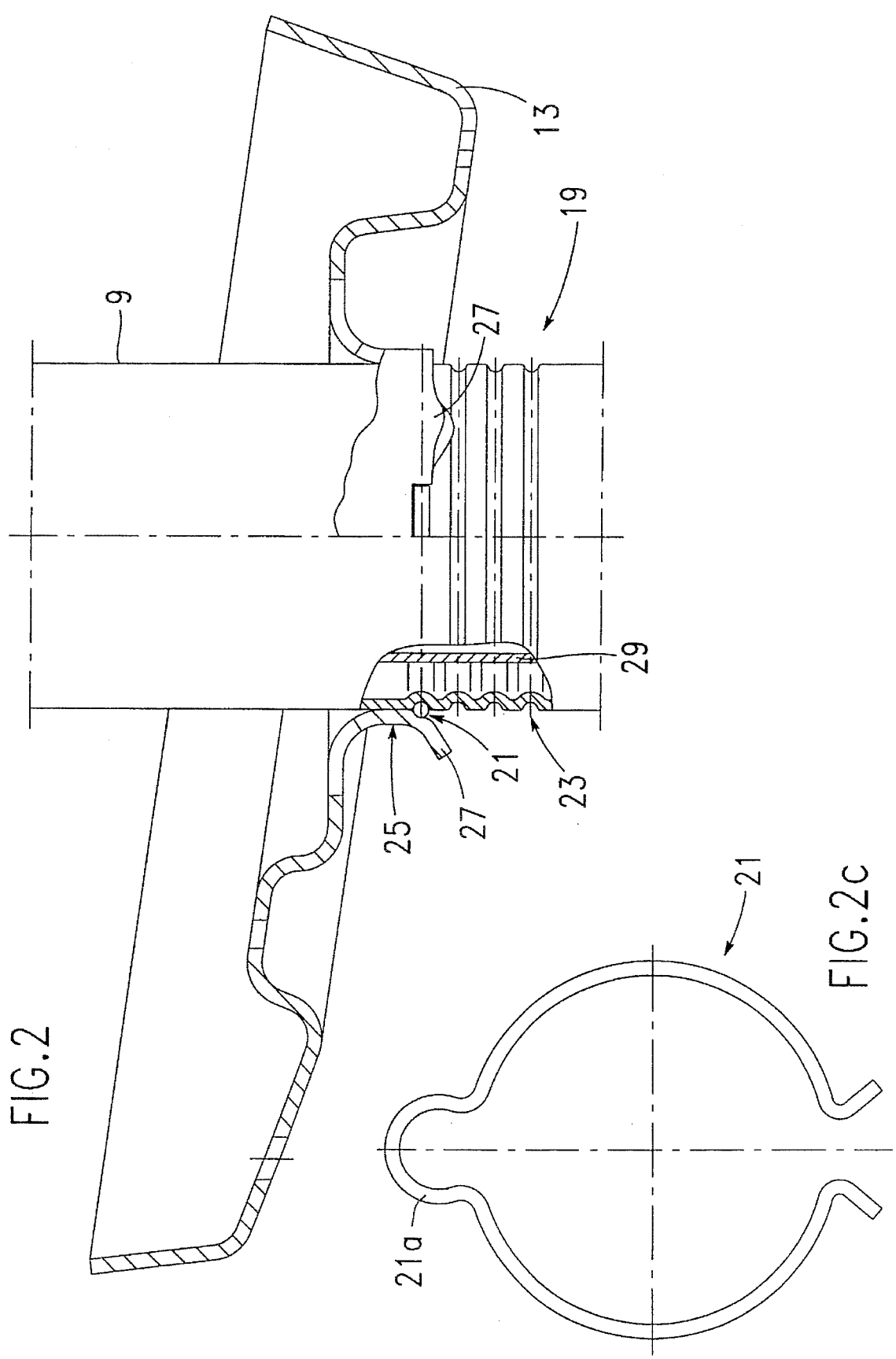

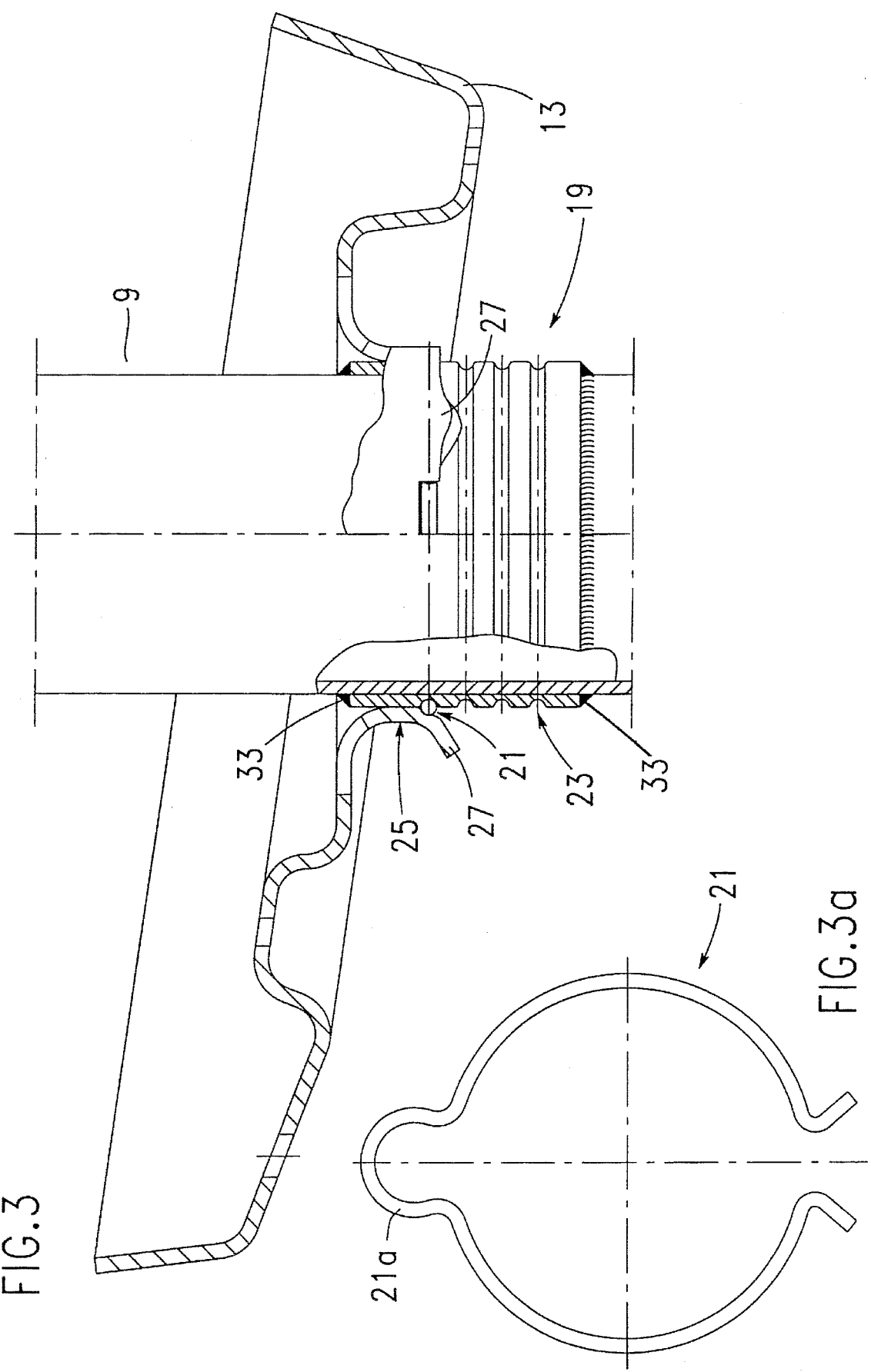

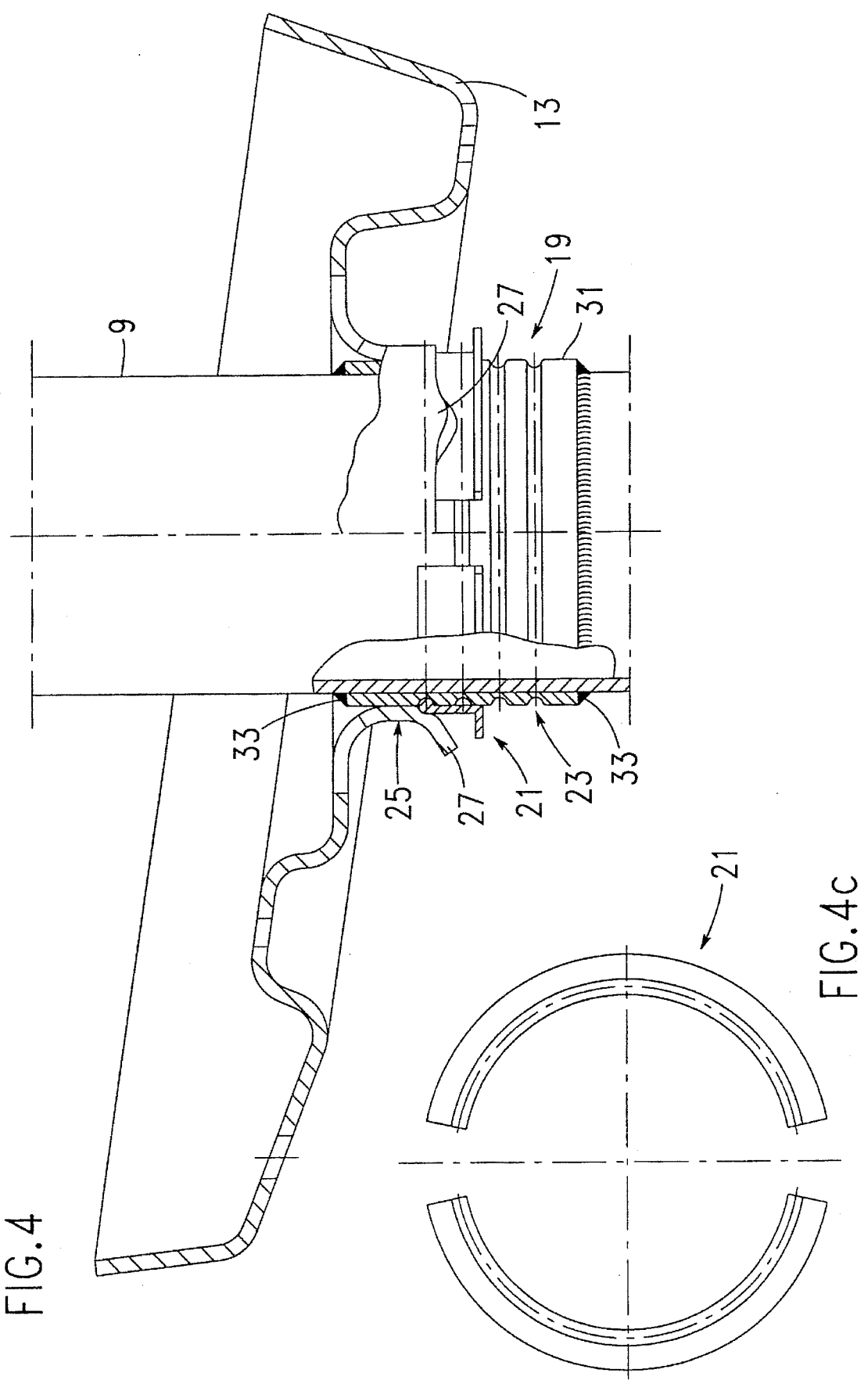

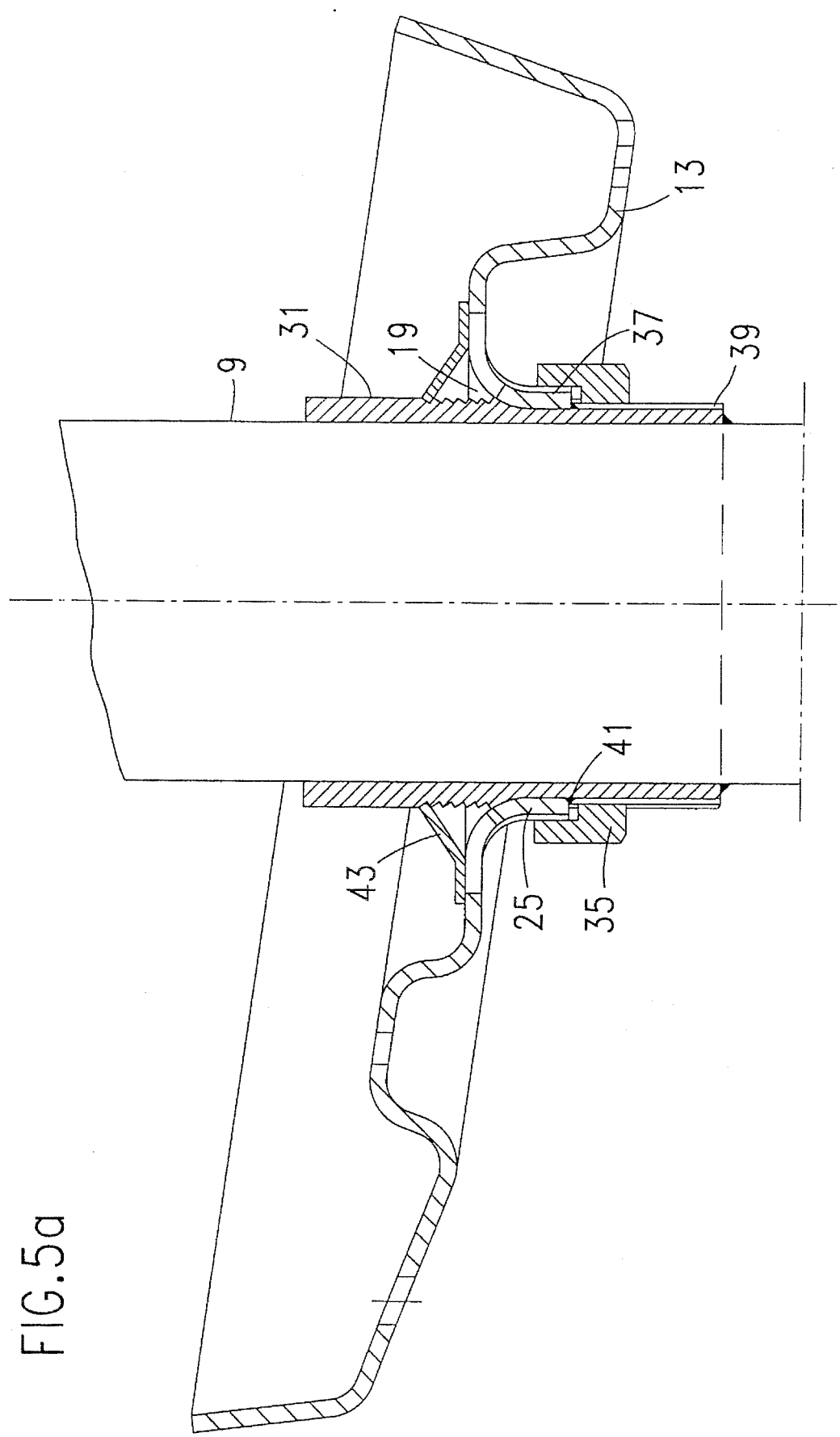

VIBRATION DAMPER ASSEMBLY HAVING A SPRING SUPPORT WITH ADJUSTABLE SPRING PLATE, AND A SPRING SUPPORT WITH ADJUSTABLE SPRING PLATE

BACKGROUND OF THE INVENTION

1. Field of the Invention

The present invention generally relates to a vibration damper assembly having a spring support, wherein the spring support comprises a first support with a spring plate and a second support with a spring plate, whereby at least one spring plate is axially adjustable, so that the spring tension of a spring between the spring plates can be changed, the spring support also comprising locking means which are active between the adjustable spring plate and the corresponding support.

The present invention also generally relates to a spring support comprising a first support with a spring plate and a second support with a spring plate, whereby at least one spring plate is axially adjustable, so that the spring tension of a spring between the spring plates can be changed, the spring support also comprising locking means which are active between the adjustable spring plate and the corresponding support.

2. Background Information

A spring support such as that described above, in the form of a telescoping strut, is disclosed in Federal Republic of Germany Laid-Open Patent Application No. 37 30 177. On this telescoping strut, the spring plate is twisted to engage locking means which are arranged in a graduated, or stepped, fashion. The twisting of the spring plate, in particular when the telescoping strut is deliberately installed in a diagonal, inclined, sloping or bevelled position to compensate for the spring forces, can have the disadvantage that the diagonal position, which may be optimal from a design standpoint, is not assumed after an axial adjustment of a spring plate. As a result, the desired compensation is no longer achieved.

The same can essentially be true for the case in which springs with a curved longitudinal axis are used, and which are also designed to compensate for transverse, or shear, forces. If the spring plate has to be twisted, then the spring can also be twisted along with the spring plate, so that there is essentially no longer any guarantee of adequate compensation of transverse forces.

OBJECT OF THE INVENTION

The object of the invention is to improve on known arrangements by making it possible to adjust the initial tension of the spring, so that the problems regarding compensation of transverse forces can be reliably eliminated.

SUMMARY OF THE INVENTION

The invention teaches that this object can be achieved in that the locking means are preferably loosened for the axial adjustment of the spring plate, so that during the axial adjustment, the spring plate can preferably be moved independently of the locking means from any desired position into another position essentially without twisting, and the locking means are preferably held in this position.

Because of the fact that the spring plate is not twisted, the possibility that the spring will be twisted can essentially be ruled out. Consequently, there can essentially be no changes of the lines of action of the spring forces.

The invention teaches, advantageously, that the locking means can preferably include a contoured, shaped or corrugated sleeve segment of the support and a retaining ring which can be locked in the contour. Consequently, it is possible to achieve a position of the spring plate, in the circumferential direction, essentially independent of the locking means.

The contour of the contoured sleeve segment can thereby preferably include at least two encircling beads, corrugations or creases. The number of beads can essentially determine the number of adjustment stages. The beads can be molded directly on the support, e.g. on a spring support designed as a two-tube shock absorber. On the other hand, a single-tube shock absorber with a separate sleeve segment can also be used.

To keep the expense for the locking means low, the retaining ring is preferably formed by a snap ring or circlip. An additional advantageous feature is that the snap ring can preferably have a tool engagement segment. This tool engagement segment can be used for purposes of installation, but it can be particularly useful for purposes of removal.

So that there is not an excess load on the retaining ring caused by frequent adjustment of the spring plate, the retaining ring can preferably be designed in multiple sections. As an additional protective measure, the spring plate can advantageously have a tubular body which holds the retaining ring in the contoured segment. For this purpose, there can preferably be several lugs distributed around the circumference of the tubular body of the spring plate.

In one alternative embodiment, the retaining ring of the locking means is preferably formed by a diaphragm spring, or cup spring. The diaphragm spring can thereby be axially permanently connected to the spring plate, to configure the locking of the locking means preferably so that the locking means are actuated automatically.

As an additional protective measure, the support can be connected to the spring plate preferably by means of a locking screw connection, or set screw connection. This locking screw connection can preferably be comprised, in a simple fashion, of a conical surface of a screwed union ring and a corresponding opposite surface of the tubular body of the spring plate. So that a twisting motion of the spring plate with respect to the support is essentially impossible under any circumstances, the invention teaches that an axial guidance can preferably be applied between the spring plate and the support.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

In summary, one aspect of the invention resides broadly in a vibration damper assembly for being mounted in a motor vehicle, the vibration damper assembly comprising: a cylinder defining a chamber therein, the cylinder for containing a damping fluid; the cylinder defining a longitudinal axis therethrough; a first end apparatus and a second end apparatus; the cylinder being disposed between the first end apparatus and the second end apparatus; means, provided at the first end apparatus of the shock absorber, for connecting the shock absorber to the body of a motor vehicle; means, provided at the second end apparatus of the shock absorber, for connecting the shock absorber to the suspension of a motor vehicle; a piston rod, the piston rod sealingly projecting into the cylinder and being axially displaceable with respect to the cylinder; a piston being attached to the piston rod, the piston being slidably disposed within the cylinder to sealingly divide the chamber into first and second chambers; means for supporting a motor vehicle suspension spring, the motor vehicle suspension spring for being disposed external to the cylinder; the supporting means comprising plate means; the plate means comprising means for accommodating an end of a motor vehicle suspension spring; means for axially adjusting the plate means to adjust the tension of a motor vehicle suspension spring accommodated by the plate means; the axial adjustment means comprising: means for axially fixing the plate means in a first, predetermined axial position; means for axially fixing the plate means in a second, predetermined axial position; means for loosening the plate means with respect to the first, predetermined axial position to permit axial displacement of the plate means from the first, predetermined axial position and to a second, predetermined axial position; the second, predetermined axial position being different from the first, predetermined axial position; and the means for loosening the plate means and permitting axial displacement of the plate means comprising means for permitting movement of the plate means, from the first, predetermined position to the second predetermined position, substantially solely in an axial direction.

Another aspect of the invention resides broadly in a method of adjusting a vehicle suspension spring with respect to a vibration damper assembly in a motor vehicle, the method comprising the steps of: providing a vibration damper assembly, the vibration damper assembly comprising; a cylinder defining a chamber therein, the cylinder for containing a damping fluid; the cylinder defining a longitudinal axis therethrough; a first end apparatus and a second end apparatus; the cylinder being disposed between the first end apparatus and the second end apparatus; means, provided at the first end apparatus of the shock absorber, for connecting the shock absorber to the body of a motor vehicle; means, provided at the second end apparatus of the shock absorber, for connecting the shock absorber to the suspension of a motor vehicle; a piston rod, the piston rod sealingly projecting into the cylinder and being axially displaceable with respect to the cylinder; a piston being attached to the piston rod, the piston being slidably disposed within the cylinder to sealingly divide the chamber into first and second chambers; means for supporting a motor vehicle suspension spring, the motor vehicle suspension spring for being disposed external to the cylinder; the supporting means comprising plate means; the plate means comprising means for accommodating an end of a motor vehicle suspension spring; means for axially adjusting the plate means to adjust the tension of a motor vehicle suspension spring accommodated by the plate means; the axial adjustment means comprising: means for axially fixing the plate means in a first, predetermined axial position; means for axially fixing the plate means in a second, predetermined axial position; means for loosening the plate means with respect to the first, predetermined axial position to permit axial displacement of the plate means from the first, predetermined axial position and to a second, predetermined axial position; the second, predetermined axial position being different from the first, predetermined axial position; and the means for loosening the plate means and permitting axial displacement of the plate means comprising means for permitting movement of the plate means, from the first, predetermined position to the second predetermined position, substantially solely in an axial direction; mounting the vibration damper assembly in a motor vehicle; accommodating an end of a motor vehicle suspension spring in the plate means; axially adjusting the plate means, subsequent to mounting the vibration damper assembly in the motor vehicle; the step of axially adjusting the plate means comprises the steps of: axially fixing the plate means in a first, predetermined axial position; loosening the plate means with respect to the first, predetermined axial position to permit axial displacement of the plate means from the first, predetermined axial position and to a second, predetermined axial position, the second, predetermined axial position being different from the first, predetermined axial position; moving the plate means, from the first, predetermined position to the second predetermined position, substantially solely in an axial direction; and axially fixing the plate means in the second, predetermined axial position.

BRIEF DESCRIPTION OF THE DRAWINGS

The invention is explained below in greater detail with reference to the accompanying drawings, wherein:

FIG. 1 is a schematic diagram of the installation of a spring support;

FIGS. 2 and 2c illustrate an embodiment of a spring support;

FIGS. 2a and 2b are essentially the same view as FIGS. 2c, but additionally showing a spring;

FIGS. 3 and 3a, 4 and 4c illustrate embodiments of a spring support;

FIG. 5a is essentially the same view as FIG. 5, but more detailed; and

DESCRIPTION OF THE PREFERRED EMBODIMENT

Figure 5:
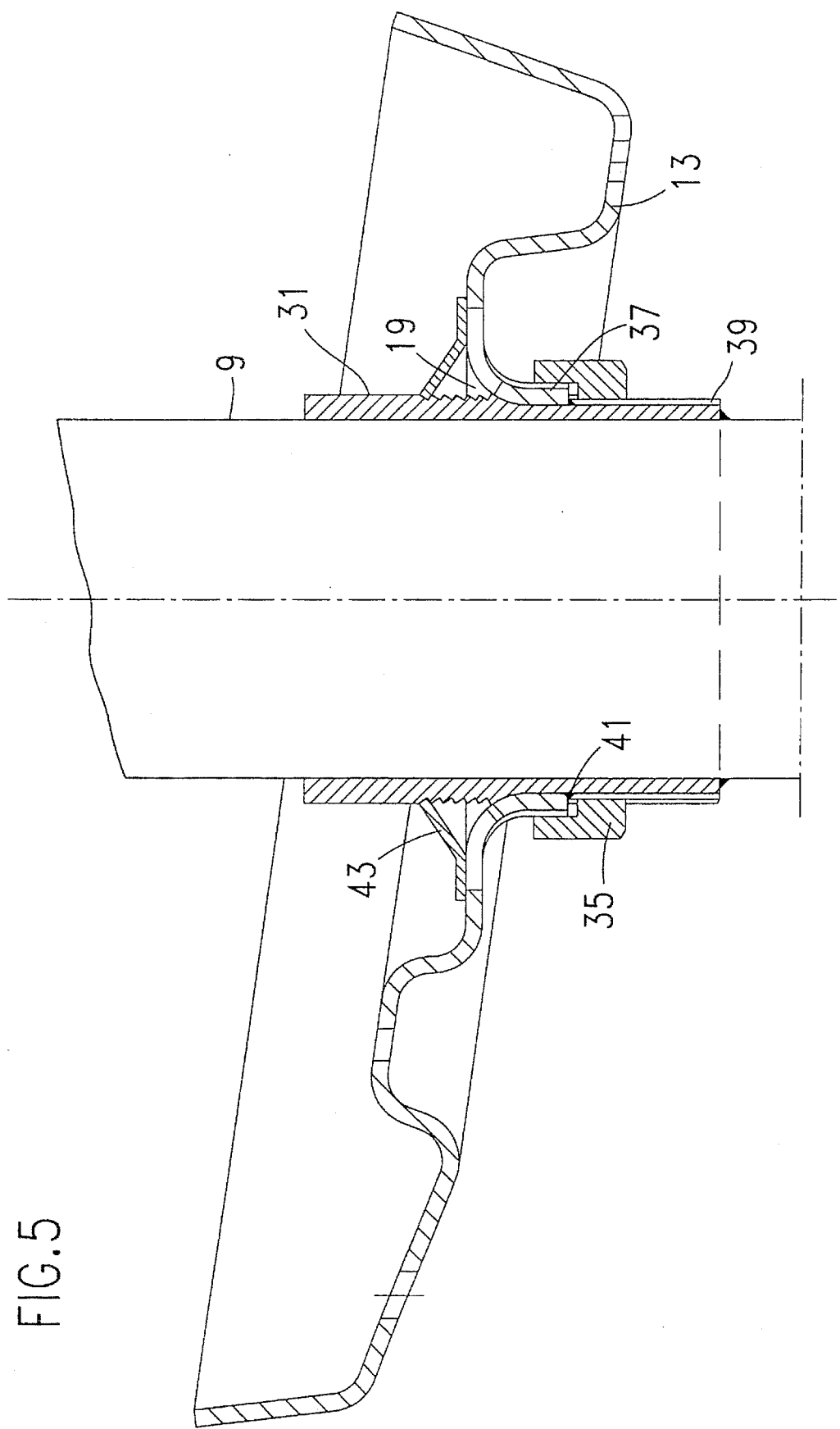
FIG. 5 illustrates an embodiment of a spring support.

FIG. 1 is a simplified diagram of the installation of a spring support 1, preferably in a motor vehicle. The spring support 1 can be located, essentially in hinged fashion, by means of fastening elements 3a, 3b, between a vehicle axle 5 and a vehicle superstructure 7. It is generally unimportant as to whether the vehicle axle 5 is an articulated axle or an unarticulated axle. It is also conceivable that the invention could be used in a motorcycle.

It will be appreciated that, in accordance with at least one preferred embodiment of the present invention, the spring support and spring plates disclosed hereinbelow could conceivably be utilized with any or all of the following: one-tube shock absorbers, two-tube shock absorbers, and MacPherson struts. It is conceivable to utilize the spring support and spring plates of at least one embodiment of the present invention with other types of vibration dampers. It is conceivable to utilize the spring support and spring plates of at least one embodiment of the present invention in different types of motor vehicles, including automobiles and motorcycles.

The spring support 1 can conceivably include a first and a second support 9/11. Each of the supports 9/11 can have a spring plate 13/15, whereby at least one of the spring plates 13/15 can be adjusted axially with respect to the corresponding support 9/11, preferably to adjust the initial tension of a spring 17. The spring 17 can conceivably be for use in, or as, a vehicle suspension spring braced between the spring plates 13/15, so that the vehicle suspension system can be adjusted to meet the requirements of a particular application.

FIG. 2 shows portions of a support, e.g. the support 9, with the spring plate 13. The support 9 preferably has locking means to permit axial adjustment of the spring plate 13.

The locking means can preferably be embodied by a contoured, shaped or corrugated sleeve segment 19 in which a retaining ring 21 can preferably be locked. The contour can preferably include several encircling beads, corrugations, grooves or recesses 23 which are essentially worked directly into the support 9. Preferably formed on the spring plate 13 is a tubular body 25, by means of which the spring plate 13 is preferably supported on the retaining ring 21. The tubular body 25 thereby preferably holds the retaining ring 21 inside the beads 23, so that the retaining ring 21 essentially cannot expand. Lugs, studs or cams 27 are preferably formed on the tubular body 25 and preferably act as an additional safety measure.

FIG. 2c illustrates an overhead view the retaining ring 21 shown in FIG. 2.

Thus, in accordance with at least one preferred embodiment of the present invention, a sleeve segment 19 may preferably be provided with beads or grooves 23. The beads/grooves 23 are preferably configured so as to be able to accommodate at least a portion of a retaining ring 21 therewithin. Preferably disposed about retaining ring 21 is tubular, or annular body 25, which may preferably be embodied by an annular portion of spring plate 13 disposed substantially directly adjacent support 9. Retaining ring 21 is preferably held into the beads 23 by tubular body 25. Preferably, in accordance with at least one preferred embodiment of the present invention, the fit of retaining ring 21 in a bead 23, surrounded by annular body 25, will preferably be sufficient so as to enable spring support 13 to absorb forces transmitted by a spring 17 (see FIG. 2a).

As shown in FIG. 2c, the retaining ring 21 is preferably formed by an elastic circlip or guard ring. The latter is preferably slotted so that the retaining ring 21 can preferably expand. The expandability is preferably present so that the retaining ring 21 can be installed, and also so that the retaining ring 21 can assume another locked position.

The retaining ring 21 also preferably has a tool engagement segment 21a preferably in the form of a lug, so that the retaining ring 21 can be installed even with the simplest tools, e.g. a hammer, without thereby damaging the retaining ring. Conversely, the retaining ring 21 can be removed very easily using essentially nothing more than commercially-available pliers, which can be applied to the tool engagement segment 21a.

Thus, in accordance with at least one preferred embodiment of the present invention, the retaining ring 21 can preferably be configured as shown in FIG. 2c, such that its mounting about support 9 can be facilitated. Particularly, an open end 21b of retaining ring 21 (see FIG. 2b) can preferably be configured to allow retaining ring 21 to be essentially expanded and subsequently disposed in one of the beads 23. Tool engagement segment 21a can preferably be provided, among other reasons, to facilitate removal of retaining ring 21 from support 9 such as, for example, by inserting pliers or another suitable instrument into tool engagement segment 21a and pulling the ring 21 away from the support 9.

For purposes of adjustment, the spring plate 13, which in this embodiment is in a diagonal or skewed position, is preferably pushed axially by means of essentially any appropriate displacement tool, whereby the orientation of the spring plate 13 in the circumferential direction remains essentially unchanged. Then the retaining ring 21 can then be removed and reinstalled in the new locked position in the sleeve segment 19.

In the illustration of the support 9, it can be seen through the cut out portion of a cylinder tube 29 that the spring support can also simultaneously contain a shock absorber, in this case a two-tube shock absorber.

With reference to FIG. 2a, it should be understood that the illustrated arrangement of spring 17 with respect to spring plate 13 can be considered to be applicable for the embodiments illustrated in FIGS. 3–5a.

FIGS. 3 and 3a differ from FIGS. 2 and 2c essentially only in the design of the sleeve segment 19. In contrast to FIGS. 2 and 2c, the contoured sleeve segment 19 is preferably formed by a sleeve 31 which can be connected to the support 9 by means of encircling weld seams 33. Therefore, a single-tube shock absorber can also be used as the spring support 1.

FIGS. 4 and 4c in turn differ from the embodiments explained above essentially in that the retaining ring 21 is preferably divided into multiple sections. Therefore, essentially no bending loads are exerted on the retaining ring, if the retaining ring is locked in the contour 19. For easier handling, the retaining ring 21 can preferably be designed as an angle ring or bevelled ring.

Figures 4A, 4B:
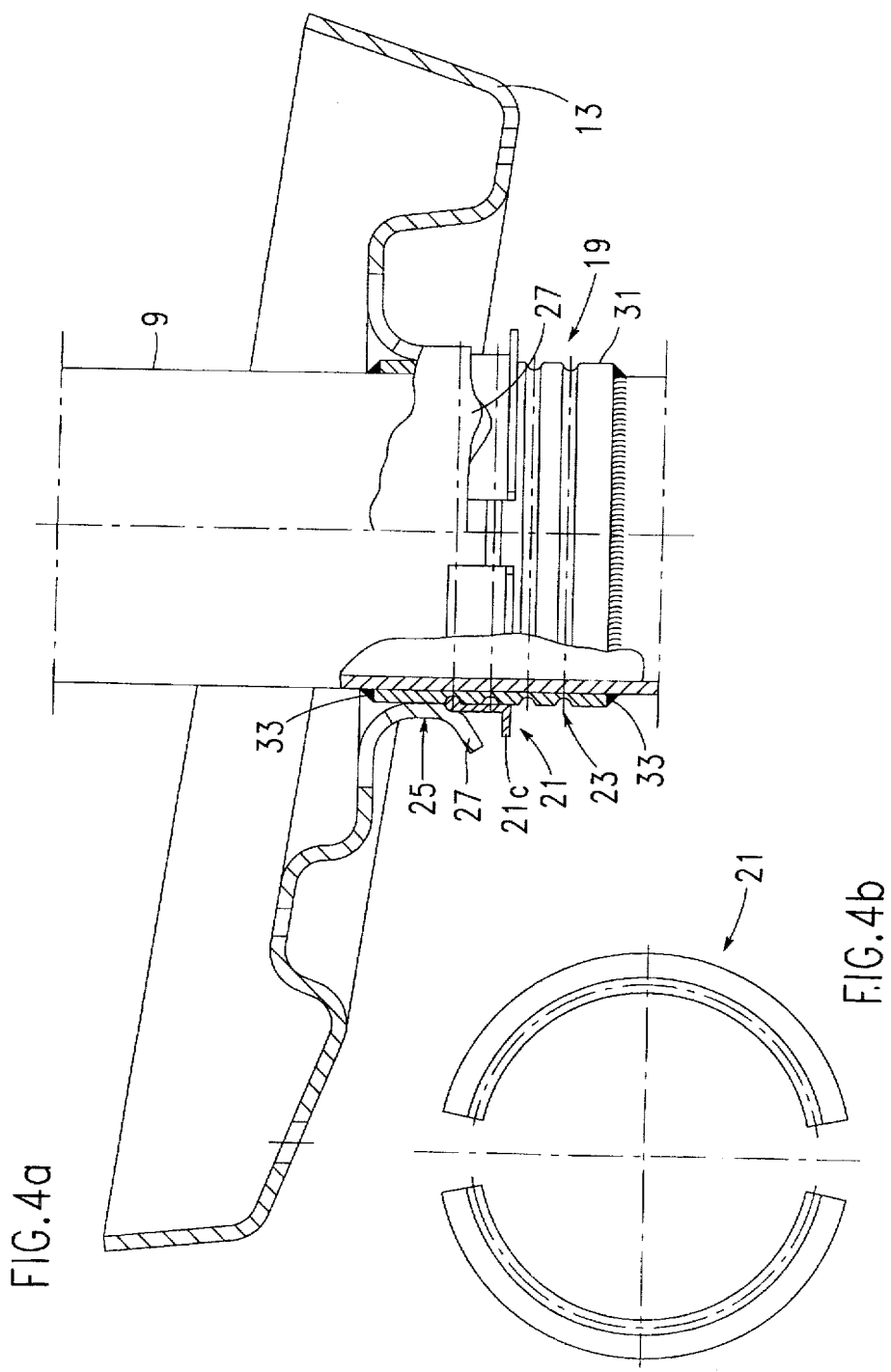
FIGS. 4a and 4b are essentially the same view as FIGS. 4 and 4c, but more detailed.

In accordance with at least one preferred embodiment of the present invention, as illustrated in FIGS. 4a and 4b, retaining ring 21, particularly each portion thereof, may preferably include a flanged portion 21c. Flanged portion 21c may preferably be oriented substantially perpendicular with respect to the longitudinal axis of the spring support 9.

In the variants illustrated in FIGS. 2 to 4b, the spring 17 essentially holds the spring plate 13 in a position defined by the retaining ring inside the contour. In contrast, in the variant illustrated in FIG. 5, a connection by means of a locking screw can preferably be used to fix the spring plate 13 in place. A screwed union ring 35 and the tubular body 25 (see FIG. 5a) of the spring plate 13, which form the locking screw connection, thereby essentially have conical surfaces 37 which preferably face one another. The conical surfaces 37 make it possible to brace the tubular body 25 on the outer shell, outer shell surface, outer jacket, or outer jacket surface 39 of the support 9. So that the spring plate 13 is not twisted when the screwed union ring is tightened, axial guidance can preferably be provided by means of a tongue-and-groove guide 41.

In accordance with at least one preferred embodiment of the present invention, screwed union ring 35 may preferably be threaded with respect to tubular body 25. Screwed union ring 35 and tubular body 25 may also preferably have opposing conical surfaces 37, the conical surfaces 37 being sufficient, in engagement with one another, for bracing tubular body 25 on outer shell 39. To avoid twisting of spring plate 13 (and tubular body 25) with respect to support 9, a tongue-and-groove arrangement 41 may preferably be provided to both axially guide and circumferentially fix tubular body 25. In accordance with at least one preferred embodiment of the present invention, if tongue-and-groove arrangement 41 is embodied by tongues extending from outer shell 39 into grooves in tubular body 25, then screwed union ring 35 may preferably have an inner diameter sufficiently large enough to provide a clearance with respect to the tongues, to permit rotation of screwed union ring 35 essentially without contacting the tongues. Alternatively, there could conceivably be tongues extending radially inwardly from tubular body 25 into grooves disposed in outer shell 39.

The embodiment of FIG. 5 also has locking means which comprise a retaining ring and contoured sleeve segment 19. The difference is that the locking means are preferably located above the spring plate 13, and thus do not exert essentially any retaining function with respect to a spring 17. The function of the locking means is rather to make possible a very broad tolerance and, above all, a reproducible setting of the axial position of the spring plate 13. For that purpose, a diaphragm spring 43, which can preferably be permanently connected to the spring plate 13, preferably acts as a retaining ring, so that if the screwed union ring 35 is loosened and an axial adjustment is made, the diaphragm spring 43 preferably assumes a defined or selected position.

In the embodiment illustrated in FIG. 5, the spring plate 13 assumes the highest axial position. After the screwed union ring 35 is loosened, the spring plate 13 with the diaphragm spring 43 can be pushed axially downward until the diaphragm spring 43 is once again locked in the desired position in the contoured sleeve segment 31. The diaphragm spring thereby provides a sufficient steadying force so that the screw connection with its conical surfaces is secure.

Figure 6:
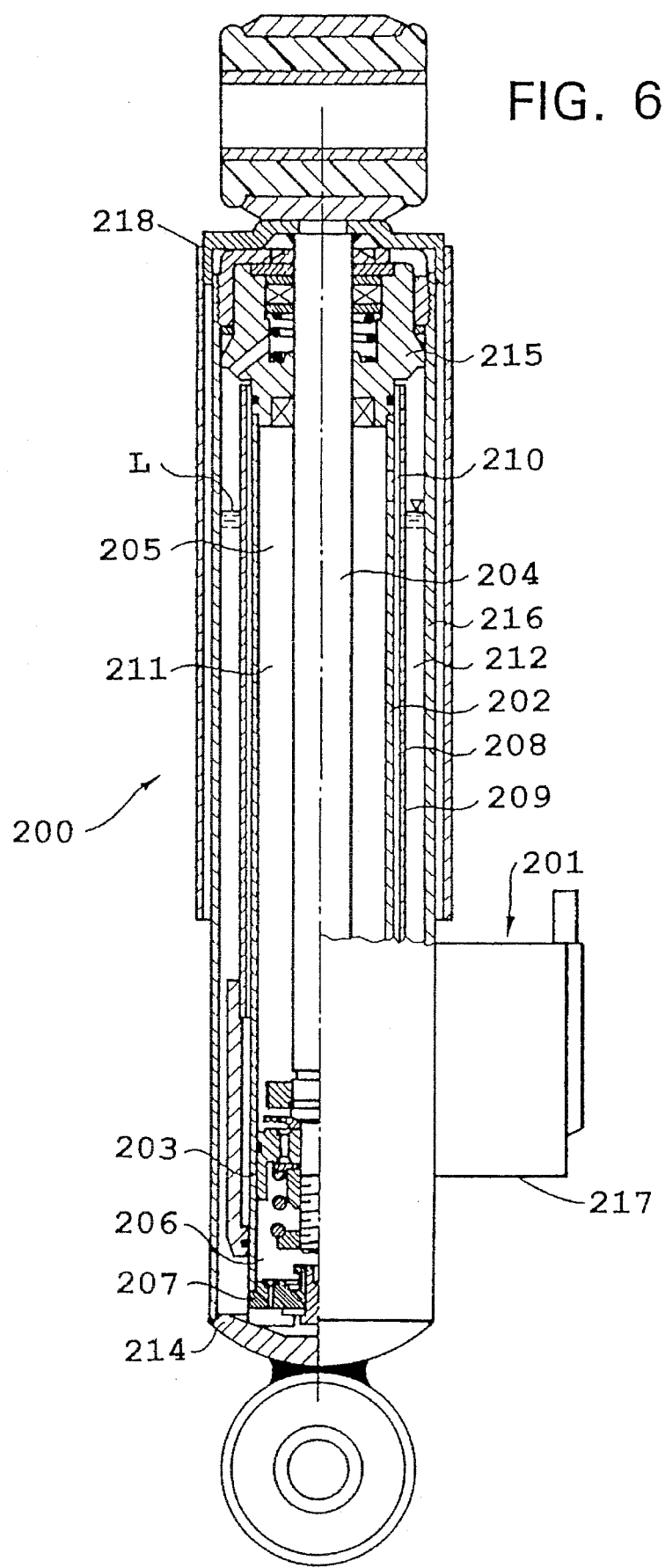
FIGS. 6 and 7 illustrate a shock absorber, and components thereof, which may be utilized in accordance with the embodiments of the present invention.
Figure 7:
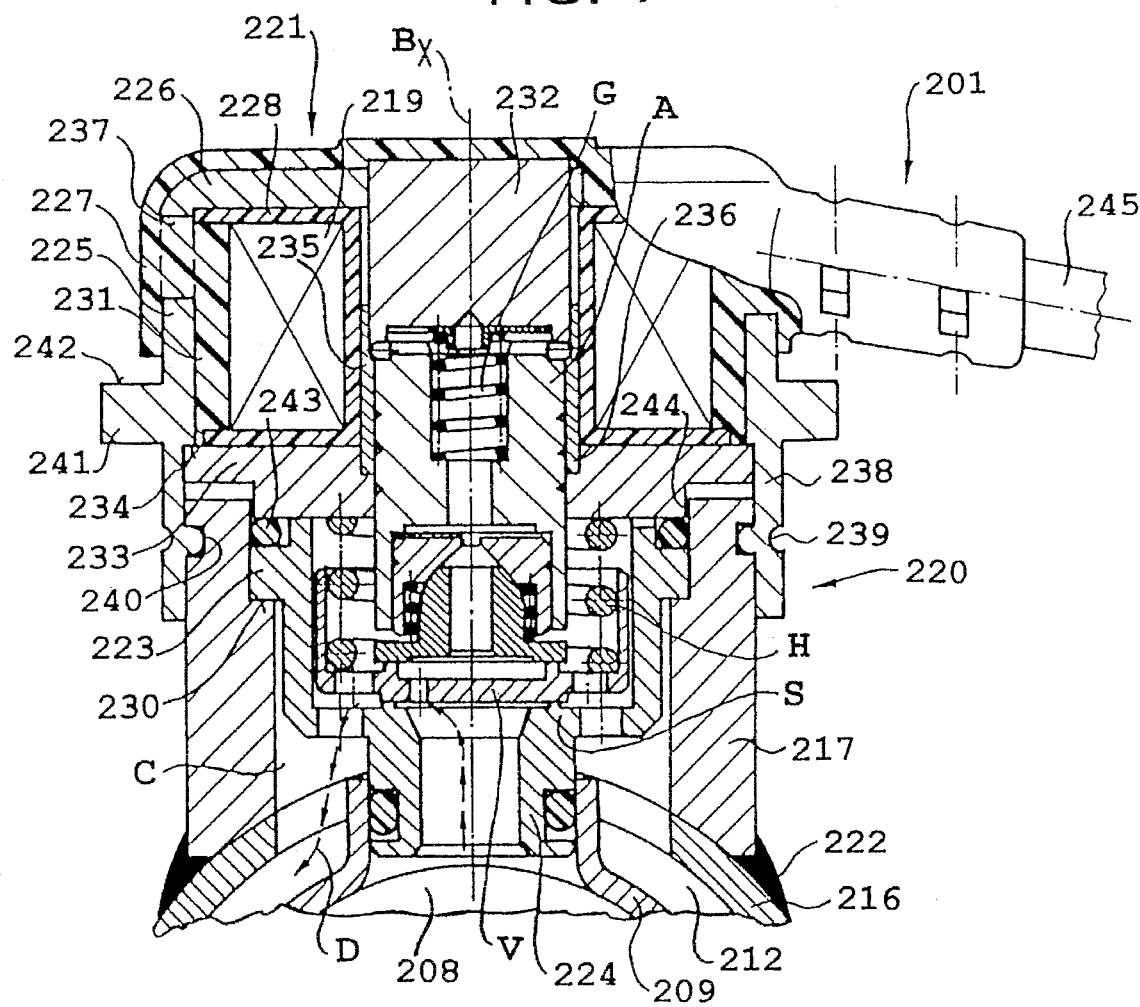

FIGS. 6 and 7 show a typical shock absorber or vibration damper in which the embodiments of the present invention may conceivably be incorporated. It should be understood that the components found hereinbelow may be considered to be interchangeable with similar components discussed hereinabove with reference to FIGS. 1–5a.

FIG. 6 shows a complete shock absorber or oscillation damper 200, a detailed illustration of the valve unit 201 being omitted for the sake of clarity. The oscillation damper 200 essentially includes a pressure pipe 202 in which a piston 203 on a piston rod 204 divides a working space 205 into an upper or piston-rod-side working chamber 211 and a lower working chamber 206. A bottom valve unit 207 closes the pressure pipe 202 at the lower end thereof. A fluid path 208 is formed between the pressure pipe 202 and an intermediate pipe 209, said intermediate pipe 209 being arranged concentrically with respect to the pressure pipe 202. A connecting orifice 210 in the pressure pipe 202 connects the upper working chamber 211 with the fluid path 208. A compensating chamber 212 is confined between the intermediate pipe 209 and a portion of the pressure pipe 202, on the one hand, and the container tube 216 on the other hand. This compensating chamber 212 is axially limited by a base member 214 and a piston rod guiding and sealing unit 215. Both the upper and the lower working chambers 211, 206 are preferably filled with a liquid. The compensating chamber 212 is also filled with damping liquid up to the level L, and possibly contains a pressurized gas above the level L. The bottom valve unit 207 provides communication between the working chamber 206 and the compensating chamber 212. The piston 203 provides communication between the lower working chamber 206 and the upper working chamber 211.

According to an illustrative example, the oscillation damper works as follows: When the piston rod 204 moves upwards, a high flow resistance occurs across the piston 203 and a high pressure is generated in the upper working chamber 211. Liquid from the upper working chamber 211 flows through said high flow resistance into the lower working chamber 206. As the piston rod 204 moves outward of the working space 205, the available volume within the working space 205 is increased. Therefore, liquid can flow from the compensating chamber 212 through the bottom valve unit 207 into the lower working chamber 206. The flow resistance through the bottom valve unit 207 is small in this phase of operation. The movement of the piston rod 204 with respect to the pressure pipe 202 is damped.

On inward movement of the piston rod 204 fluid flows from the lower working chamber 206 through the piston 203 into the upper working chamber 211. The flow resistance across the piston 203 is relatively small and the flow resistance across the bottom valve unit 207 is relatively large. Therefore, a considerable pressure exists even within the upper working chamber 211. The volume within the working space 205 is reduced by the piston rod 204 entering into the working space 205. Thus, damping liquid must flow from the lower working chamber 206 through the bottom valve unit 207 into the compensating chamber 212. In this phase of operation the flow resistance through the bottom valve unit 207 is high, such that a high pressure occurs within the lower working chamber 206 and also within the upper working chamber 211.

By the connecting orifice 210 and the fluid path 208 the upper working chamber 211 is connected with the compensating chamber 212 via the valve unit 201. This is shown in more detail in FIG. 7, which will be described later. As long as the valve unit 201 is closed, the bypass established by the connecting orifice 210, the fluid path 208 and the valve unit 201 is also closed. This is the hardest mode of operation of the oscillation damper. When, however, the valve unit 201 is more or less opened, the bypass is also open. As a result thereof the following behavior exists: On upward movement of the piston rod 204 liquid can flow from the highly pressurized upper working chamber 211 not only across the piston 203 providing a high flow resistance but also from the working chamber 211 through the bypass 210, 208, 201 to the compensating chamber 212. As such, the damping force can be reduced.

When the piston rod 204 moves downwards, there exists again a high pressure within the upper working chamber 211, as described above. Therefore, damping liquid can flow from the upper working chamber 211 through the bypass 210, 208, 201 to the compensating chamber 212. This means that the damping liquid which must be expelled from the working space 205 as a result of the reduced volume therein does not only escape through the bottom valve unit 207 to the compensating chamber 212 but can also partially escape through the bypass 210, 208, 201 to the compensating chamber 212. As such, the damping force can again be reduced by the open bypass 210, 208, 207. It is to be noted that the direction of flow of the damping liquid through the bypass 210, 208, 207 is the same, both on upward movement and downward movement of the piston rod 204 with respect to the pressure pipe 202. By increasing the flow resistance through the valve unit 201 the damping force can be increased both for upward and downward movement of the piston rod 204, and by increasingly opening the valve unit 201 the damping force can be reduced both for upward movement and downward movement of the piston rod 204. It is possible to selectively open and close the valve unit or to continuously vary the flow resistance through the valve unit 201.

In FIG. 7 one can again see the fluid path 208 and the compensating chamber 212, which are interconnectable through the valve unit 201. The fluid path 208 is connected to the upper working chamber 211 as shown in FIG. 6. The flow direction from the fluid path 208 to the compensating chamber 212 across the valve unit 201 is indicated in FIG. 7 by the dotted line D provided with arrows indicating the flow direction both for inward movement and outward movement of the piston rod 204 with respect to the pressure pipe 202. One can see in FIG. 7 a valve member V which can be lifted with respect to a valve seat S, such as to open the flow path D from the fluid path 208 to the compensating chamber 212.

For explaining the principles of the embodiment of the present invention shown in FIGS. 6 and 7, it is sufficient to say that the valve member V is urged downward in the closing sense towards the valve seat S by a helical compression spring H and that the valve member V can be lifted in response to upward movement of an electromagnetic armature member A. This armature member A is biased in downward direction by a helical compression spring G and can be lifted by energization of a magnetic coil 219 which is energized through a current supple cable 245.

The valve unit 201 comprises a housing 220. This housing 220 is composed by the side tube 217 and a cover unit 221. The side tube 217 is welded at 222 to the container tube 216. The cover unit 221 is fastened to the side tube 217.

A pot-shaped valve components housing 223 is inserted into the side tube 217 and is axially located on a shoulder face 230 inside the side tube 217. Various valve components are located inside the valve components housing 223. The lower end of the valve components housing 223 is shaped as a tube section 224, which provides the valve seat S and is sealingly connected to the fluid path 208.

The cover unit 221 comprises an iron jacket 225 integral with an iron end wall 226. The iron jacket 225 and the iron end wall 226 are coated with a plastic layer 227. The annular electromagnetic coil 219 is housed within the iron jacket 225. This electromagnetic coil 219 is carried by a coil carrier 228, which is annular about the axis $B_x$ and is open in a radially outward direction. The coil carrier 228 is closed in the radially outward direction by a plastics material 231 integral with the plastic layer 227 through openings 237 of the iron jacket 225. The plastics layer 227 and the plastics material 231 are integrally moulded by injection moulding with the iron jacket 225, the iron end wall 226 integral therewith, and the electromagnetic coil 219 and carrier 228 being inserted into the injection mould.

A ferromagnetic core 232 is inserted into a central opening of the iron end wall 226 and covered by the plastics layer 227. An iron flange portion 233 is provided at the lower side of the electromagnetic coil 219 and is engaged with a shoulder face 234 of the iron jacket 225. A pole tube 235 is seated within an annular recess 236 of the iron flange portion 233. The pole tube 235 is sealingly connected to the iron flange portion 233 and to the ferromagnetic core 232. The armature A is guided within the pole tube 235. The pole tube 235 is made of nonmagnetic material so that the magnetic field lines are deflected by the lower end of the pole tube 235. The iron jacket 225, the iron end wall 226, the ferromagnetic core 232 and the iron flange portion 233 form a ferromagnetic core arrangement which toroidally surrounds the electromagnetic coil 219.

The cover unit 221 is fastened to the side tube 217 by a sleeve-shaped extension 238 of the iron jacket 225. This sleeve-shaped extension 238 axially overlaps the side tube 217 by a circumferential bead 239 being embossed into a circumferential groove 240 on the radially outer face of the side tube 217. The iron jacket 225 is provided with a pretensioning flange 241. The pretensioning flange 241 offers a pretension face 242. The cover unit 221 can be pretensioned in downward direction as shown in FIG. 7 toward the container tube 216 by a pretensioning tool engaging the container tube 216, on the one hand, and the pretensioning face 242, on the other hand. As such, the iron flange portion 233 can be pressed against the upper end of the valve components housing 233, the valve components housing 223 is engaged with the shoulder face 230 of the side tube 217, and the iron flange portion 233 is engaged with the shoulder face 234 of the iron jacket 225. The helical compression spring H is compressed between the iron flange portion 233 and the valve member V, which is seated on the valve seat S.

While maintaining this pretension of the cover unit 221 against the side tube 217, the bead 239 is rolled or caulked into the circumferential groove 240 of the side tube 217 so that after removing the pretensioning tool an internal pretension is maintained. A sealing ring 243 is, therefore, maintained in sealing engagement with the valve components housing 223, the iron flange portion 233 and the side tube 217. As such, the compartment C confined by the side tube 217 and the cover unit 221 is sealed against atmosphere. All components of the valve unit 201 are positioned with respect to each other, and the helical compression spring H as well as the helical compression spring G and further springs are biased to the desired degree.

It is to be noted that the upper end of the side tube 217 is radially engaged at 244 with the iron flange portion 233 such that when rolling or caulking the bead 239 into the groove 240, no deformation of the side tube 217 and of the iron jacket 225 can occur.

The electromagnetic coil 219 is completely separated from the liquid within the compartment C by the iron flange portion 233. The pretension during connecting the cover unit 221 and the side tube 217 is selected such that no play can occur.

In recapitulation, it will be understood that, the present invention, in accordance with at least one embodiment thereof, is directed to a spring support comprising a first support with a spring plate and a second support with a spring plate, whereby at least one spring plate is axially adjustable, so that the spring tension of a spring between the spring plates can be changed, the spring support also comprising locking means which are active between the adjustable spring plate and the corresponding support, characterized by the fact that the locking means are loosened for the axial adjustment of the spring plate so that during the axial adjustment, the spring plate can be moved independently of the locking means from any desired position into another position without twisting, and the locking means are held in this position.

One feature of the invention resides broadly in the spring support, comprising a first support with a spring plate and a second support with a spring plate, whereby at least one spring plate is axially adjustable, so that the spring tension of a spring between the spring plates can be changed, as well as locking means which are active between the adjustable spring plate and the corresponding support, characterized by the fact that the locking means are loosened for the axial adjustment of the spring plate 13,15, so that during the axial adjustment, the spring plate 13,15 can be moved independently of the locking means from any desired position into another position without twisting, and the locking means are held in this position.

Another feature of the invention resides broadly in the spring support characterized by the fact that the locking means consist of a contoured sleeve segment 19,31 of the support 9,11 and a retaining ring 21 which can be locked in the contoured segment.

Yet another feature of the invention resides broadly in the spring support characterized by the fact that the contoured segment consists of at least two encircling beads 23.

Still another feature of the invention resides broadly in the spring support characterized by the fact that the retaining ring 21 is formed by a snap ring.

A further feature of the invention resides broadly in the spring support characterized by the fact that the snap ring has a tool engagement segment 21a.

Another feature of the invention resides broadly in the spring support characterized by the fact that the retaining ring 21 is designed in multiple sections.

Yet another feature of the invention resides broadly in the spring support characterized by the fact that the spring plate 9,11 has a tubular body 25 which holds the retaining ring 21 in the contoured segment.

Still another feature of the invention resides broadly in the spring support characterized by the fact that there are several lugs 27 distributed over the circumference on the tubular body 25 of the spring plate 13,15.

A further feature of the invention resides broadly in the spring support characterized by the fact that the retaining ring is formed by a diaphragm spring 43.

Another feature of the invention resides broadly in the spring support characterized by the fact that the diaphragm spring 43 is axially permanently connected to the spring plate 13,15.

Yet another feature of the invention resides broadly in the spring support characterized by the fact that the support 9 is connected to the spring plate 13,15 by means of a locking screw.

Still another feature of the invention resides broadly in the spring support characterized by the fact that the locking screw connection consists of a conical surface 37 of a screwed union ring 35 and a corresponding opposite surface of the tubular body 25 of the spring plate 13,15.

A further feature of the invention resides broadly in the spring support characterized by the fact that an axial guidance is provided between the spring plate 13,15 and the support 9,11.

Examples of shock absorber assemblies which, may be utilized in accordance with the embodiments of the present invention, may be disclosed in the following U.S. Patents: U.S. Pat. No. 4,838,393, which issued to Mourray et al. on Jun. 13, 1989; U.S. Pat. No. 4,817,928, which issued to Paton on Apr. 4, 1989; U.S. Pat. No. 4,527,674, which issued to Mourray on Jul. 9, 1985; and U.S. Pat. No. 4,749,069, which issued to Knecht et al. on Jun. 7, 1988.

Examples of MacPherson struts, which may be utilized in accordance with the embodiments of the present invention, may be found in the following U.S. Patents: U.S. Pat. No. 4,944,524 (Jul. 31, 1990); and U.S. Pat. No. 4,477,061 (Oct. 16, 1984).

All of the patents, patent applications and publications recited herein, and in the Declaration attached hereto, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. Vibration damper assembly for being mounted in a motor vehicle, said vibration damper assembly comprising:

a cylinder defining a chamber therein, said cylinder for containing a damping fluid;

said cylinder defining a longitudinal axis therethrough;

a first end apparatus and a second end apparatus; said cylinder being disposed between said first end apparatus and said second end apparatus;

means, provided at said first end apparatus of said vibration damper assembly, for connecting said vibration damper assembly to a motor vehicle body;

means, provided at said second end apparatus of said vibration damper assembly, for connecting said vibration damper assembly to a motor vehicle suspension;

a piston rod, said piston rod sealingly projecting into said cylinder and being axially displaceable with respect to said cylinder;

a piston being attached to said piston rod, said piston being slidably disposed within said cylinder to sealingly divide said chamber into first and second chambers;

means for supporting a motor vehicle suspension spring, such a motor vehicle suspension spring for being disposed external to said cylinder;

said supporting means comprising a spring plate;

said spring plate comprising means for accommodating an end of such a motor vehicle suspension spring;

means for axially adjusting said spring plate to adjust the tension of such a motor vehicle suspension spring accommodated by said spring plate;

said axial adjustment means comprising:

means for axially fixing said spring plate in a first, predetermined axial position;

means for axially fixing said spring plate in a second, predetermined axial position;

means for loosening said spring plate with respect to said first, predetermined axial position to permit axial displacement of said spring plate from said first, predetermined axial position and to said second, predetermined axial position;

said second, predetermined axial position being different from said first, predetermined axial position;

said loosening means comprising a ring-shaped retaining member;

said ring-shaped retaining member being movable to permit movement of said spring plate from said first, predetermined position to said second, predetermined axial position, substantially solely in an axial direction;

said ring-shaped retaining member being movable in a solely axial direction; and said ring-shaped retaining member being solely mechanically movable.

2. The vibration damper assembly according to claim 1, wherein:

said loosening means further comprises a plurality of grooves for accommodating said ring-shaped retaining member;

said spring plate is movable into said first, predetermined axial position with said ring-shaped retaining member being accommodated by a first one of said grooves; and said spring plate is movable into said second, predetermined axial position with said ring-shaped retaining member being accommodated by a second one of said grooves.

3. The vibration damper assembly according to claim 2, wherein:
said supporting means comprises a support element for supporting said spring plate, said support element comprising at least a portion of said axial adjustment means;
said ring-shaped retaining member and said grooves comprise means, for acting between said spring plate and said support element, for holding said spring plate with respect to said support element;
said grooves comprising said means for axially fixing said spring plate in a first, predetermined axial position and said means for axially fixing said spring plate in a second, predetermined axial position; and
said ring-shaped retaining member having at least a portion for being loosened, to permit axial displacement of said spring plate, the axial displacement of said spring plate being independent of said ring-shaped retaining member.

4. The vibration damper assembly according to claim 3, wherein:
said cylinder has a circumference defined about said longitudinal axis; and
said loosening means comprises means for permitting movement of said spring plate, from said first, predetermined axial position to said second, predetermined axial position, substantially solely in an axial direction without twisting movement of said spring plate in a circumferential direction of said cylinder.

5. The vibration damper assembly according to claim 4, wherein said ring-shaped retaining member is fixedly held when said spring plate is in one of said first and second, predetermined axial positions.

6. The vibration damper assembly according to claim 5, wherein:
said ring-shaped retaining member comprises a diaphragm spring, said diaphragm spring being permanently connected, with respect to the axial direction of said cylinder, to said spring plate; and
said diaphragm spring has means for being accommodated in each of said grooves, to selectively position said spring plate in either of said first, predetermined axial position and said second, predetermined axial position.

7. The vibration damper assembly according to claim 6, further comprising:
means for fixedly connecting said supporting means to said spring plate;
said means for fixedly connecting comprising a locking screw;
said locking screw comprising a screwed union ring, said screwed union ring having a conical surface;
said spring plate having a tubular portion disposed generally concentrically with respect to said cylinder and having an axial extent defined along the axial direction of said cylinder; and
said tubular portion having an external surface configured to interface with said conical surface of said screwed union ring.

8. The vibration damper according to claim 7, further comprising means for axially guiding said spring plate with respect to said support element.

9. The vibration damper assembly according to claim 8, wherein:
said spring plate is a first spring plate;
said vibration damper assembly comprises a second spring plate, said second spring plate comprising means for accommodating an end of a motor vehicle suspension spring different from an end accommodated by said first spring plate;
said plurality of grooves comprise more than two grooves;
said support element comprises a sleeve element being a component separate from said cylinder, said sleeve element being disposed directly adjacent, and concentrically with respect to, said cylinder;
said grooves comprising a plurality of circumferentially disposed indentations in said sleeve element;
said diaphragm spring having a first edge portion and a second edge portion;
said first edge portion being fixedly attached to said spring plate;
said second edge portion comprising said portion for being disposed in said groove arrangements;
said second edge portion being disposed remotely from said tubular portion of said spring plate; and
said means for axially guiding said spring plate comprising a tongue-and-groove arrangement disposed along said axial direction of said cylinder, said tongue-and-groove arrangement comprising:
first portions, disposed on said sleeve element;
and second portions, disposed on said spring plate, for slidably engaging with said first portions to permit axial displacement of said spring plate with respect to said cylinder without circumferential displacement of said spring plate with respect to said cylinder.

10. The vibration damper assembly according to claim 5, wherein:
said groove arrangements comprise circumferentially disposed beads for accommodating at least a portion of said retaining ring;
said retaining ring comprises a snap ring;
said snap ring comprises a portion for accommodating a tool for facilitating loosening of said snap ring, to permit loosening of said holding means, to permit axial displacement of said spring plate;
said spring plate comprises a tubular portion for being disposed about and adjacent said retaining ring and for holding said retaining ring in each of said beads; and
said spring plate further comprises a plurality of lug portions extending away from said tubular portion, each of said plurality of lug portions being flanged away from said cylinder.

11. The vibration damper assembly according to claim 10, wherein:
said cylinder has an external surface; and
said external surface of said cylinder comprising said contoured portion, such that said beads are indented directly into said external surface of said cylinder.

12. The vibration damper assembly according to claim 11, wherein:
said support element comprises a sleeve element being a component separate from said cylinder, said sleeve element being disposed directly adjacent, and concentrically with respect to, said cylinder; and
said sleeve element comprising said contoured portion, such that said beads are indented into said sleeve element.

13. The vibration damper assembly according to claim 5, wherein:

said groove arrangements comprise circumferentially disposed beads for accommodating at least a portion of said retaining ring;

said retaining ring comprises multiple, non-contiguous sections;

said spring plate comprises a tubular portion for being disposed about and adjacent said retaining ring and for holding said retaining ring in each of said beads; and said spring plate further comprises a plurality of lug portions extending away from said tubular portion, each of said plurality of lug portions being flanged away from said cylinder.

14. Method of adjusting a vehicle suspension spring with respect to a vibration damper assembly in a motor vehicle, said method comprising the steps of:

providing a vibration damper assembly, the vibration damper assembly comprising:

a cylinder defining a chamber therein, the cylinder for containing a damping fluid;

the cylinder defining a longitudinal axis therethrough;

a first end apparatus and a second end apparatus; the cylinder being disposed between the first end apparatus and the second end apparatus;

means, provided at the first end apparatus of the vibration damper assembly, for connecting the vibration damper assembly to a body of a motor vehicle;

means, provided at the second end apparatus of the vibration damper assembly, for connecting the vibration damper assembly to a suspension of a motor vehicle;

a piston rod, the piston rod sealingly projecting into the cylinder and being axially displaceable with respect to the cylinder;

a piston being attached to the piston rod, the piston being slidably disposed within the cylinder to sealingly divide the chamber into first and second chambers;

means for supporting a motor vehicle suspension spring, such a motor vehicle suspension spring for being disposed external to the cylinder;

the supporting means comprising a spring plate;

the spring plate comprising means for accommodating an end of such a motor vehicle suspension spring;

means for axially adjusting the spring plate to adjust the tension of such a motor vehicle suspension spring accommodated by the spring plate;

the axial adjustment means comprising:

means for axially fixing the spring plate in a first, predetermined axial position;

means for axially fixing the spring plate in a second, predetermined axial position;

means for loosening the spring plate with respect to the first, predetermined axial position to permit axial displacement of the spring plate from the first, predetermined axial position and to the second, predetermined axial position;

the second, predetermined axial position being different from the first, predetermined axial position; and the loosening means comprising a ring-shaped retaining member;

the ring-shaped retaining member being movable to permit movement of the spring plate from the first, predetermined position to the second predetermined position, substantially solely in an axial direction;

the ring-shaped retaining member being movable in a solely axial direction; and the ring-shaped retaining member being solely mechanically movable;

mounting the vibration damper assembly in a motor vehicle; accommodating an end of a motor vehicle suspension spring in the spring plate;

axially adjusting the spring plate, subsequent to mounting the vibration damper assembly in the motor vehicle;

said step of axially adjusting the spring plate comprises the steps of:

axially fixing the spring plate in the first, predetermined axial position;

loosening the spring plate with respect to the first, predetermined axial position to permit axial displacement of the spring plate from the first, predetermined axial position and to the second, predetermined axial position;

permitting movement of the spring plate by moving the ring-shaped retaining member;

moving the spring plate, from the first, predetermined axial position to the second, predetermined axial position, substantially solely in an axial direction; and axially fixing the spring plate in the second, predetermined axial position.

15. The method according to claim 14, further comprising the steps of:

configuring the loosening means to further comprise a plurality of grooves for accommodating the ring-shaped retaining member;

said step of axially fixing the spring plate in the first, predetermined axial position comprises accommodating the ring-shaped retaining member in a first one of the grooves; and said step of axially fixing the spring plate in the second, predetermined axial position comprises accommodating the ring-shaped retaining member in a second one of the grooves.

16. The method according to claim 15, further comprising the steps of:

configuring the supporting means to comprise a support element for supporting the spring plate, the support element comprising at least a portion of the axial adjustment means;

configuring the ring-shaped retaining member and grooves to comprise means, for acting between the spring plate and the support element, for holding the spring plate with respect to the support element;

configuring the grooves to comprise the means for axially fixing the spring plate at the first, predetermined axial position and the means for axially fixing the spring plate at the second, predetermined axial position;

configuring the ring-shaped retaining member to have at least one portion for being loosened, to permit axial displacement of the spring plate, the axial displacement of the spring plate being independent of the ring-shaped retaining member;

the cylinder having a circumference defined about the longitudinal axis;

configuring the loosening means to comprise means for permitting movement of the spring plate, from the first, predetermined axial position to the second, predetermined axial position, substantially solely in an axial direction without twisting movement of the spring plate in a circumferential direction of the cylinder;

said step of axially fixing in the first, predetermined axial position comprising the step of disposing the ring-shaped retaining member in the first groove;

said step of axially fixing in the second, predetermined axial position comprising the step of disposing the ring-shaped retaining member in the second groove;

said loosening step comprising the step of loosening the at least one portion of the ring-shaped retaining member for being loosened and permitting axial displacement of the spring plate; and said moving step comprising the step of axially displacing the spring plate independently of the holding means, substantially solely in an axial direction and without twisting movement of the spring plate in a circumferential direction of the cylinder.

17. The method according to claim 16, further comprising the step of configuring the vibration damper assembly such that:

the ring-shaped retaining member is fixedly held when the spring plate is in one of the first and second, predetermined axial positions.

18. The method according to claim 17, further comprising the step of configuring the vibration damper assembly such that:

the ring-shaped retaining member comprises a diaphragm spring, the diaphragm spring being permanently connected, with respect to the axial direction of the cylinder, to the spring plate;

the diaphragm spring has means for being accommodated in each of the grooves, to selectively position the spring plate in either of the first, predetermined axial position and the second, predetermined axial position;

the vibration damper assembly comprises means for fixedly connecting the supporting means to the spring plate;

the means for fixedly connecting comprising a locking screw;

the locking screw comprising a screwed union ring, the screwed union ring having a conical surface;

the spring plate having a tubular portion disposed generally concentrically with respect to the cylinder and having an axial extent defined along the axial direction of the cylinder;

the tubular portion having an external surface configured to interface with the conical surface of the screwed union ring;

the vibration damper assembly comprising means for axially guiding the spring plate with respect to the support element;

the spring plate is a first spring plate;

the vibration damper assembly comprises a second spring plate, the second spring plate comprising means for accommodating an end of a motor vehicle suspension spring different from an end accommodated by the first spring plate;

the plurality of grooves comprise more than two grooves;

the support element comprises a sleeve element being a component separate from the cylinder, the sleeve element being disposed directly adjacent, and concentrically with respect to, the cylinder;

the grooves comprising a plurality of circumferentially disposed indentations in the sleeve element;

the diaphragm spring having a first edge portion and a second edge portion;

the first edge portion being fixedly attached to the spring plate;

the second edge portion comprising the portion for being disposed in the groove arrangements;

the second edge portion being disposed remotely from the tubular portion of the spring plate; and the means for axially guiding the spring plate comprising a tongue-and-groove arrangement disposed along the axial direction of the cylinder, the tongue-and-groove arrangement comprising:

first portions, disposed on the sleeve element;

and second portions, disposed on the spring plate, for slidably engaging with the first portions to permit axial displacement of the spring plate with respect to the cylinder without circumferential displacement of the spring plate with respect to the cylinder.

19. The method according to claim 17, further comprising the step of configuring the vibration damper assembly such that:

the groove arrangements comprise circumferentially disposed beads for accommodating at least a portion of the retaining ring;

the spring plate comprises a tubular portion for being disposed about and adjacent the retaining ring and for holding the retaining ring in each of the beads;

the spring plate further comprises a plurality of lug portions extending away from the tubular portion, each of the plurality of lug portions being flanged away from the cylinder; and the vibration damper assembly further comprises one of the following sets of features (A) and (B):

(A):

the retaining ring comprises a snap ring; and the snap ring comprises a portion for accommodating a tool for facilitating loosening of the snap ring, to permit loosening of the holding means, to permit axial displacement of the spring plate; and (B):

the retaining ring comprises multiple, non-contiguous sections.

* * * * *

UNITED STATES PATENT AND TRADEMARK OFFICE
CERTIFICATE OF CORRECTION

PATENT NO. : 5,553,713
DATED : September 10, 1996
INVENTOR(S) : Heinz SYDEKUM. Manfred ANGLES and Frank HASSMANN It is certified that error appears in the above-indentified patent and that said Letters Patent is hereby corrected as shown below:

Insert the attached sheet of drawings containing Figures 4a and 4b to the drawings currently included with the patent.
SEE ATTACHED DRAWING In column 4, line 35, after the second occurrence of 'FIGS.' insert --2 and--.

Signed and Sealed this

Twenty-seventh Day of May, 1997

Attest:

BRUCE LEHMAN

*Attesting Officer*  *Commissioner of Patents and Trademarks*